United States Patent [19]
Anand et al.

[11] Patent Number: 6,044,466
[45] Date of Patent: Mar. 28, 2000

[54] FLEXIBLE AND DYNAMIC DERIVATION OF PERMISSIONS

[75] Inventors: Rangachari Anand, Teaneck, N.J.; Frederique-Anne Giraud, Ossining, N.Y.; Nayeem Islam, Thornwood, N.Y.; Trent Ray Jaeger, Croton-on Hudson, N.Y.; Jochen Liedtke, Ossining, N.Y.

[73] Assignee: International Business Machines Corp., Armonk, N.Y.

[21] Appl. No.: 08/979,807

[22] Filed: Nov. 25, 1997

[51] Int. Cl.⁷ .................................................. G06F 12/14
[52] U.S. Cl. ............................................................ 713/200
[58] Field of Search .................................. 713/200, 201; 709/225, 229; 364/222.5, 286.4, 286.5; 711/163; 707/9

[56] References Cited

U.S. PATENT DOCUMENTS

| | | | |
|---|---|---|---|
| 5,265,221 | 11/1993 | Miller | 395/725 |
| 5,335,346 | 8/1994 | Fabbio | 395/600 |
| 5,649,099 | 7/1997 | Theimer et al. | 395/187.01 |
| 5,911,143 | 6/1999 | Deinhart et al. | 707/103 |
| 5,924,094 | 7/1999 | Sutter | 707/10 |
| 5,925,126 | 7/1999 | Hsieh | 713/200 |
| 5,966,715 | 10/1999 | Sweeney et al. | 707/203 |
| 5,968,177 | 10/1999 | Batten-Carew et al. | 713/201 |

OTHER PUBLICATIONS

Yellin, "Low Level Security in Java", http://java.sun.com/sfaq/verifier.html, pp 1–12, Dec. 1996.

Bank, "Java Security", http://www-swiss.ai.mit.edu/~jbank/javapaper.html, pp 1–11, Dec. 1995.

Thomas, "The Navigator Java Environment: Current Security Issues", http://developer.netscape.com/docs/manuals/javasecurity.html, pp. 1–3, Jan. 1996.

Jaeger et al., "Implementation of a Discretionary Access Control Model for Scrip–based Systems", 8th IEEE Computer Security Foundations Workshop Proceedings, pp 70–84, Jun. 1995.

Sandhu et al., "Role–Based Access Control: A Multi–Dimensional View", IEEE 10th Annual Computer Security Applications Conference Proceedings, pp 54–62, Dec. 1994.

Anand et al., "A Flexible Security Model for Using Internet Content", IEEE The Sixteenth Symposium on Reliable Distributed Systems Proceedings, pp 89–96, Oct. 1997.

Unknown, "HotJava(tm): The Security Story", http://java.sun.com/sfaq/may95/security.html, pp. 1–7, May 1995.

Trent Jaeger, Aviel D. Rubin, Atul Prakash, "Building Systems That Flexibly Control Downloaded Executable Content", USENIX Association, 6th USENIX Security Symposium, pp. 131–148.

Nayeem Islam, Rangachari Anand, Trent Jaeger and Josyula R. Rao, "A Flexible Security System For Using Internet Content", IEEE Software, Sep./Oct. 1997, pp. 52–59.

*Primary Examiner*—Robert W. Beausoliel, Jr.
*Assistant Examiner*—Stephen C. Elmore
*Attorney, Agent, or Firm*—Scully, Scott, Murphy & Presser; Kevin N. Jordan, Esq.

[57] ABSTRACT

A dynamic derivation mechanism is defined which enables limited permissions to be dynamically and flexibly derived for executables based upon their authenticated description. The dynamic derivation mechanism uses the authenticated description to determine the maximal permissions that individual principals can delegate to the content. A principal's maximal permissions for content define a superset of the rights that that principal will actually delegate to that content. Although the maximal permissions are derived from predefined specifications, the specifications can be sensitive to runtime state on the downloader's system or previous delegations to enable the dynamic (i.e., runtime) derivation. Multiple principals can delegate a subset of their maximal permissions for the executable content. The mechanism uses policy for combining the delegated permissions into the content's runtime permissions.

44 Claims, 11 Drawing Sheets

| Permissions Structure 330 |||||
|---|---|---|---|---|
| Positive Rights: 550 | Object Group 551 | Operations 552 | Limit 553 ||
| Negative Rights: 560 | Object Group 561 | Operations 562 | ||
| Transforms: 570 | Principal 571 | Action 572 | Result 573 ||

FIG. 5

| Derivation Instance Structure 160 ||
|---|---|
| Downloading Principal | 110 |
| Content Description | 120 |
| Site Security Policy | 130 |
| Current Permissions | 140 |
| Maximal Permissions | 150 |

FIG. 6

(Create Derivation Instance 160)

(Retrieve Contributing Principals)

FIG. 10

(Derive X from Policy 810)

ND DYNAMIC DERIVATION OF
FLEXIBLE AND DYNAMIC DERIVATION OF PERMISSIONS

BACKGROUND OF THE INVENTION

1. Field of the Invention

The present invention is related to a mechanism that enables flexible and dynamic derivation of permissions for system processes using an authenticated description of the executable content run by the process and a site security policy that prescribes the principals that can delegate permissions to content of that description and limits to the permissions that may be delegated.

| Glossary | |
|---|---|
| Object | Data containing entity. |
| Operation | An action that uses an object. |
| Principal | A system subject that performs operations on objects (e.g., process) |
| Permissions | The set of objects and operations that (or Access Rights) are permitted upon those objects for a specific principal. |
| Current Permissions | The permissions of a principal at the current time. |
| Maximal Permissions | A principal's permissions that is always a superset of that principal's current permissions. |

2. Discussion of the Prior Art

Downloaded executable content are messages that contain programs that are executed upon receipt. It is well-known that downloaded executable content must be executed with limited permissions to prevent content providers from gaining unauthorized access to the downloading principal's resources (e.g., private files).

However, deriving a proper, limited set of permissions that control the execution of content can be difficult. There are two main problems: (1) content can be transient, so their permissions must often be derived anew and (2) no single principal has complete knowledge of what permissions are required and safe for content. Content execution systems enable the creation of custom content that may only be executed once per downloading principal, so the derivation of permissions must not depend upon complete prior knowledge of its behavior. Several principals have limited knowledge about the permissions that a content should be granted, but no one has the breadth of knowledge necessary to derive content permissions. For example, system administrators are often trusted to specify permissions of processes completely (e.g., mandatory access control). However, the control of content requires that system administrators know how a custom application needs to access user data. System administrators cannot know the rights needed by custom content nor can they know the semantics of user files, so they are limited in the access control decisions they can make. Other principals, such as users and application developers, may know these answers, but they are not completely trusted to make access control decisions.

Current systems depend upon predefined mappings between content and principals. Typically, this mapping is based upon the identity of an authenticated signer for the downloaded content. In addition, codebases (i.e., the source locations from which content was downloaded) are also used to identify the rights of content. Derivation of protection domains is limited because only one input is available and this input may be orthogonal to the rights required. The use of the signing principal or codebase to derive rights requires that all content from this principal or codebase be executed with the same rights. Therefore, when new content is created (and its associated public key or codebase) its rights cannot be derived even if the manufacturer and application class are known. A separation between author identity, location, and content description is necessary to overcome this limitation.

Current systems demonstrate that multiple principals can provide information to derive content permissions, but these systems lack a model of how these principals interact to make such decisions. Most systems rely primarily on one principal to make access control decisions, such as the content execution system developer (see S. Thomas, The Navigator Java Environment: Current Security Issues, at web site (URL), http://developer.netscape.com/library/documentation/javasecurity.html, which describes the Netscape 2.0 and 3.0 security model) or the user (see T. Jaeger et al., Implementation of a Discretionary Access Control Model for Scripted-based Systems, in Proceedings of the 8th IEEE Computer Security Foundations Workshop, pgs. 70–84, 1995). Most systems provide access control mechanisms, but make no commitment to how permissions are derived (see N. Borenstein, Email with a Mind of Its Own: The Safe-Tcl Language for Enabled Mail, ULPAA '94 Proceedings, pgs. 389–402, 1994 as an early example). A few systems use multiple means for deriving permissions. FlexxGuard enables users and/or system administrators to select permissions for content, but users have the ultimate decision-making power (see N. Islam et al., A Flexible Security System for Using Internet Content, in IEEE Software, pgs. 52–59, September, 1997). In Netscape's Java Capabilities API (see Netscape Communications Corp., Introduction to the Capabilities Classes, at URL html for the Netscape 4.0 security model), application developers request access rights within a limited domain specified by users and/or system administrators. However, users are not limited in the rights that they can delegate to content, and the content developer can obtain any rights within the maximal permissions by simply activating them. In a Tcl flexible content interpreter (see T. Jaeger et al., Building Systems That Flexibly Control Downloaded Executable Content, in Proceedings of the Sixth USENIX Security Symposium, pgs. 131–148, 1996.), system administrators can define how application developers may limit other content's access rights, but users may not grant rights.

RBAC models have also been used extensively to represent access control policy management, but also presently lack the flexibility to express how multiple principals can affect common access control decisions. RBAC models permit principals to assume a role, which is another principal with its own permissions. RBAC models are often used by system administrators to specify mandatory access control (MAC) policies (see R. Sandhu et al., Role-based Access Control: A Multi-Dimensional View, Proceedings of the 10th Computer Security Applications Conference). A MAC system partitions the world into two groups: (1) system administrators who specify access control policy and (2) users that are controlled by the policy. Thus, these RBAC models enable system administrators to describe the rights available to principals. The only decision a principal can make is whether to delegate all these rights to another principal.

Dynamic creation of permissions to delegate to processes is not possible because of the mandatory nature of the systems. In addition, current RBAC systems that permit discretionary access control use ACLs which do not enable the creation of dynamic principals (because ACLs need to be updated). Therefore, users, content execution systems, and application developers must develop ad hoc mechanisms for flexibly and dynamically limiting the rights that are to be delegated to the content that they execute. There appears to be nothing inherently limiting about RBAC that prevents its use in dynamic derivation of rights, but current systems are not suitable for such derivation.

SUMMARY OF THE INVENTION

The present invention defines a dynamic derivation mechanism that enables limited permissions to be dynamically and flexibly derived for executables based upon their authenticated description. The dynamic derivation mechanism uses the authenticated description to determine the maximal permissions that individual principals can delegate to the content. A principal's maximal permissions for content define a superset of the rights that that principal will actually delegate to that content. Although the maximal permissions are derived from predefined specifications, the specifications may be sensitive to runtime state on the downloader's system or previous delegations to enable the dynamic (i.e., runtime) derivation. Multiple principals can delegate a subset of their maximal permissions for the executable content. The mechanism uses policy for combining the delegated permissions into the content's current permissions.

Therefore, trusted principals (e.g., system administrators) can specify limits in which users, application developers, and content execution systems can flexibly delegate rights to the specified content.

In accordance with a preferred embodiment, a method is defined for deriving current and maximal permissions for executable content using:
a. one or more executable content descriptions;
b. one or more sets of permissions (access rights) that describe the operations that executable content can perform on objects;
c. one or more permission equations that compute one set of permissions from one or more other sets of permissions;
d. one or more permission propositions that specify conditions under which associated modifications to permissions apply;
e. one or more policy graphs that associate permissions, permission equations, and/or permission propositions with graph nodes;

The method for deriving current and maximal permissions comprises the following steps;
f. deriving one or more permission equations and one or more permission propositions from policy graphs;
g. deriving of one or more maximal sets of permissions from policy graphs;
h. selecting granted permissions from within an associated maximal set of permissions;
i. combining one or more maximal sets of permissions into the maximal permissions using one permission equation and one or more permission propositions;
j. combining one or more granted permissions into one current set of permissions which are a subset of the maximal permissions using one permission equation and one or more permission propositions.

DETAILED DESCRIPTION OF THE DRAWINGS

Figure 1:
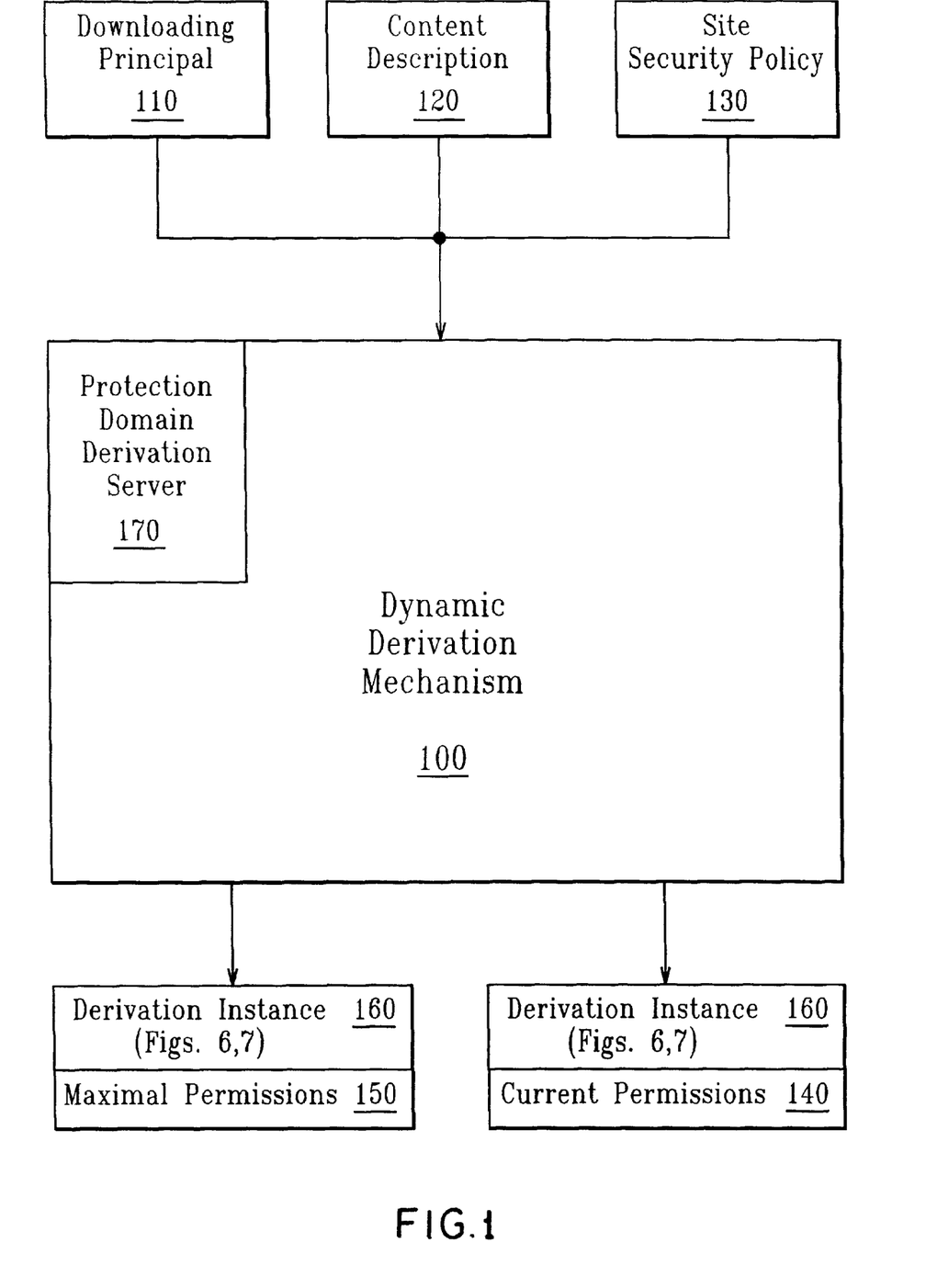
FIG. 1 illustrates how a dynamic derivation mechanism pursuant to the present invention takes an authenticated description of some executable content, a site security policy, and the identity of the downloading principal, and derives current and maximal permissions for this instance of the content's download.

As FIG. 1 depicts, the derivation mechanism (100) takes an authenticated description of some executable content (120), a site security policy (130), the identity of the downloading principal (110) and derives current and maximal permissions (140,150) for this instance of the content's download (160). When the content is executed by the downloading principal, its operations are to be authorized against the current permissions (150). It is possible to extend the current permissions (150) by adding permissions that are within the maximal permissions of the content (140).

FIG. 1 also shows that the derivation mechanism is executed by a Permission Derivation Server (170). This server (170) can be run on the downloading principal's system or on a server machine trusted by the downloading principal (e.g., a secure server in which messages are communicated to the downloading principal's system via a secure channel).

Figure 2:
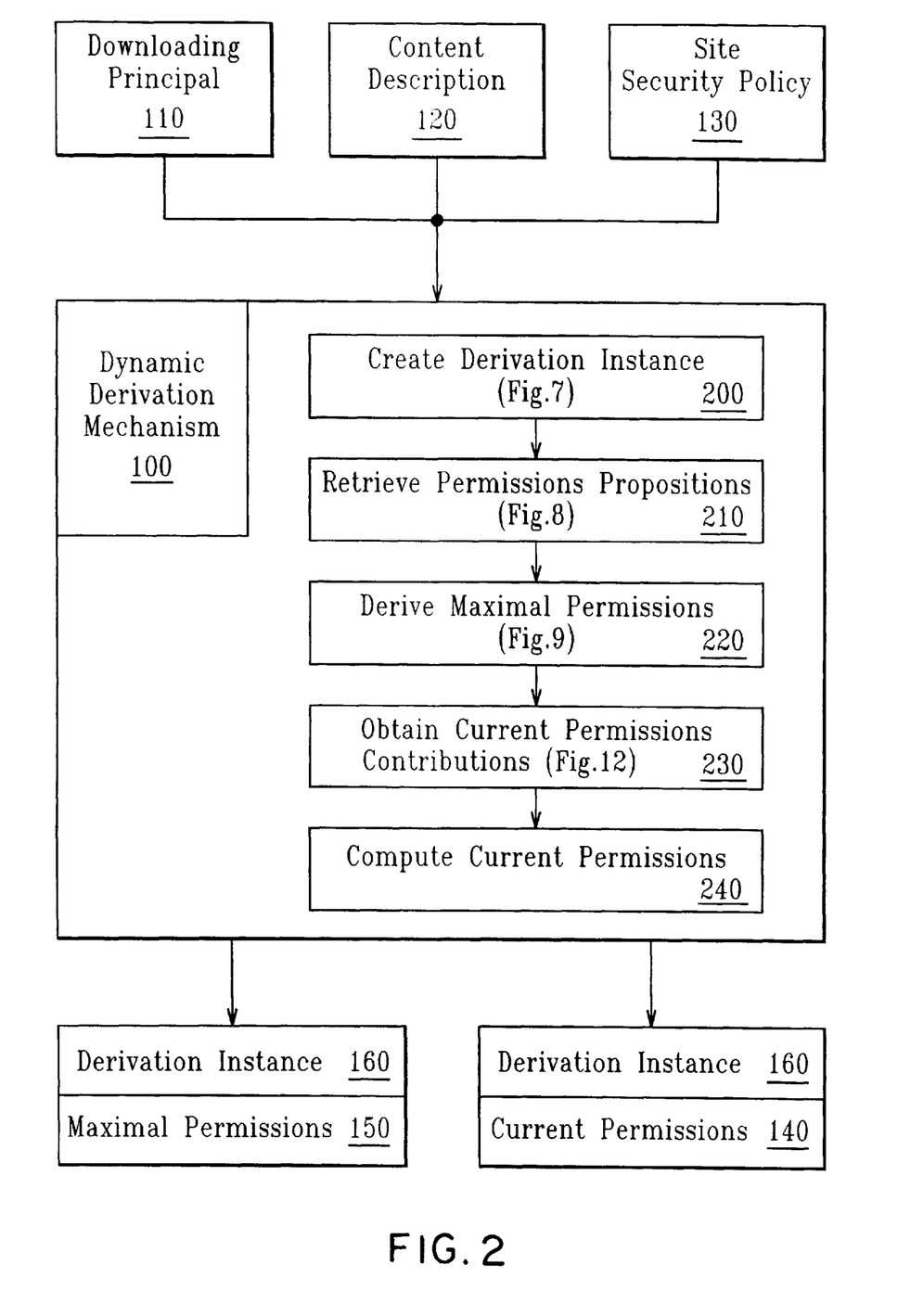
FIG. 2 illustrates five major steps implemented by the dynamic derivation mechanism of the present invention.
Figure 3:
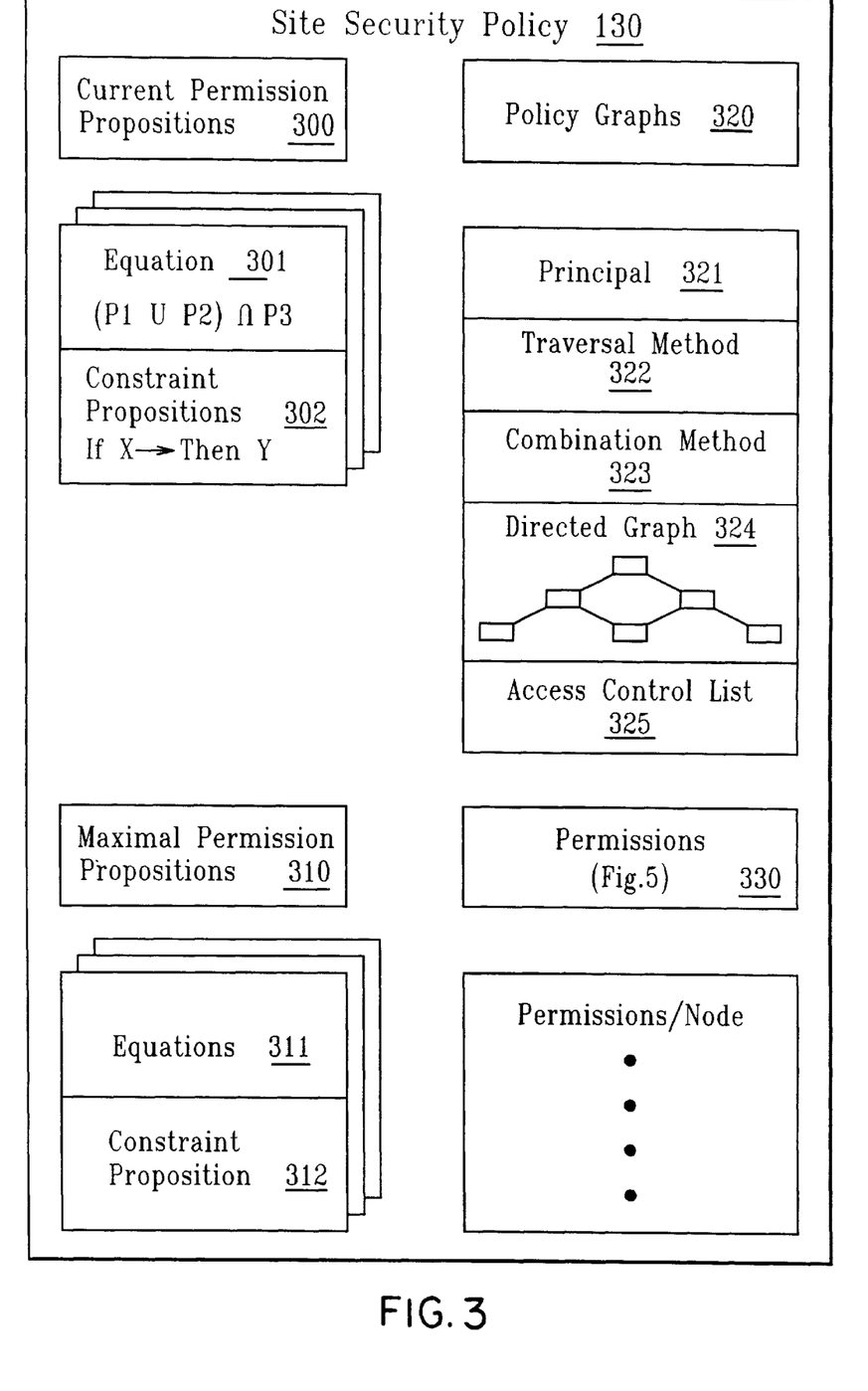
FIG. 3 shows the site security policy which includes sets of policy graphs used to derive the maximal permissions contributions that any principal can delegate to the content and sets of permissions propositions used to compute the current and maximal permissions from the maximal permissions contributions and the current permissions contributions delegated by those principals.

As FIG. 2 depicts, the derivation mechanism (100) consists of the following five steps: (1) create a derivation instance (200) for this content description (120) and downloading principal (110); (2) retrieve the current and maximal permissions propositions (210) from the site security policy (130) for the derivation instance (160); (3) derive the maximal permissions (150) from the contributions of each principal in the maximal permission proposition (220); (4) obtain the current permissions contributions (230) delegated by each principal in the current permission proposition (300), as illustrated in FIG. 3; and (5) compute the current and maximal permissions (140,150,240) using the current and maximal permissions propositions (300,310) and the current and maximal contributions (230,220) of the propositions' principals. The current permissions (150), by definition, must always be a subset of the maximal permissions (140).

The description of executable content (120) is a set of attribute-value pairs. One possible embodiment is RDF ("Resource Description Framework") labels that describe the meta-data of a website's URI ("Universal Resource Identifier"). RDF is a Web Consortium Activity (see http://www.w3.org/metadata/RDF/overview.html). Attributes with string values can be used to describe a URI.

Table 1 shows attributes used in a preferred embodiment for the content description (120). This is a modification of the content description structure used by FlexxGuard (see N. Islam et al., A Flexible Security System for Using Internet Content, in IEEE Software, pgs. 52–59, September, 1997).

TABLE 1

Content Description Attributes

| 120 Description Field | Definition |
| --- | --- |
| 121 Manufacturer | Content's originating manufacturer |
| 122 Description Author | Principal responsible for the description |
| 123 Application Classes | Application types to which the content belongs |
| 124 Application Name | Application name |
| 125 Version | Content version |
| 126 Requested Permissions | Permissions requested by the content |
| 127 Content Digest | A cryptographic digest of the content |
| 128 Application Role | Role of content in the application |

The content is created by its manufacturer (121). The content description (120) is authenticated to be from the description author (122). The description author (122) can be different from the manufacturer (121), but the derivation mechanism (100) may limit the permissions granted (140, 150) based on the site security policy's (130) trust in the description author (122). The application classes (123) indicate the types of applications to which this content belongs. The application name (124) and version (125) specify the name and version of the content. The content's cryptographic digest (127) enables verification that the content description (120) refers to the expected content. In a preferred embodiment, a one-way, collision-free hash function (see National Institute of Standards and Technology, U.S. Department of Commerce, Secure Hash Standard, Publication FIPS PUB 180-1) is used to generate such digests. The application role (128) specifies the principal that the content assumes from the application's perspective.

Content descriptions (120) should be cryptographically authenticated (i.e., integrity and source verification) or sent over a trusted communication link prior to use. In a preferred embodiment, public key cryptography is used to verify the integrity and source of content descriptions (120). Two additional fields are added to the description (120): (1) a field that contains a list of signatures and (2) a field that contains a list of public key certificates. The certificates enable the verification of any of the contained signatures.

FIG. 3 shows the site security policy (130). It includes sets of policy graphs (320) used to derive the maximal permissions contributions (150) that any principal can delegate to the content and sets of permissions propositions (300,310) used to compute the current and maximal permissions (140,150) from the maximal permissions contributions (150) and the current permissions contributions delegated by those principals.

FIG. 3 also shows the structure of a policy graph (320). A policy graph consists of a directed graph (324), a traversal method (322), a combination method (323), an access control list (325), and a downloading principal to whom the graph applies (321). The directed graph (324) stores the security policy specific to the specified downloading principal (321). The traversal method (322) determines how the directed graph (324) is traversed (e.g., from a root down or from a leaf up) when it is evaluated. The combination method (323) determines how the node's entries (430) are combined into the resultant policy value. The access control list (325) limits access to the policy graph (320). Principals can be permitted to modify any of the policy graph attributes (321–325).

Figure 4:
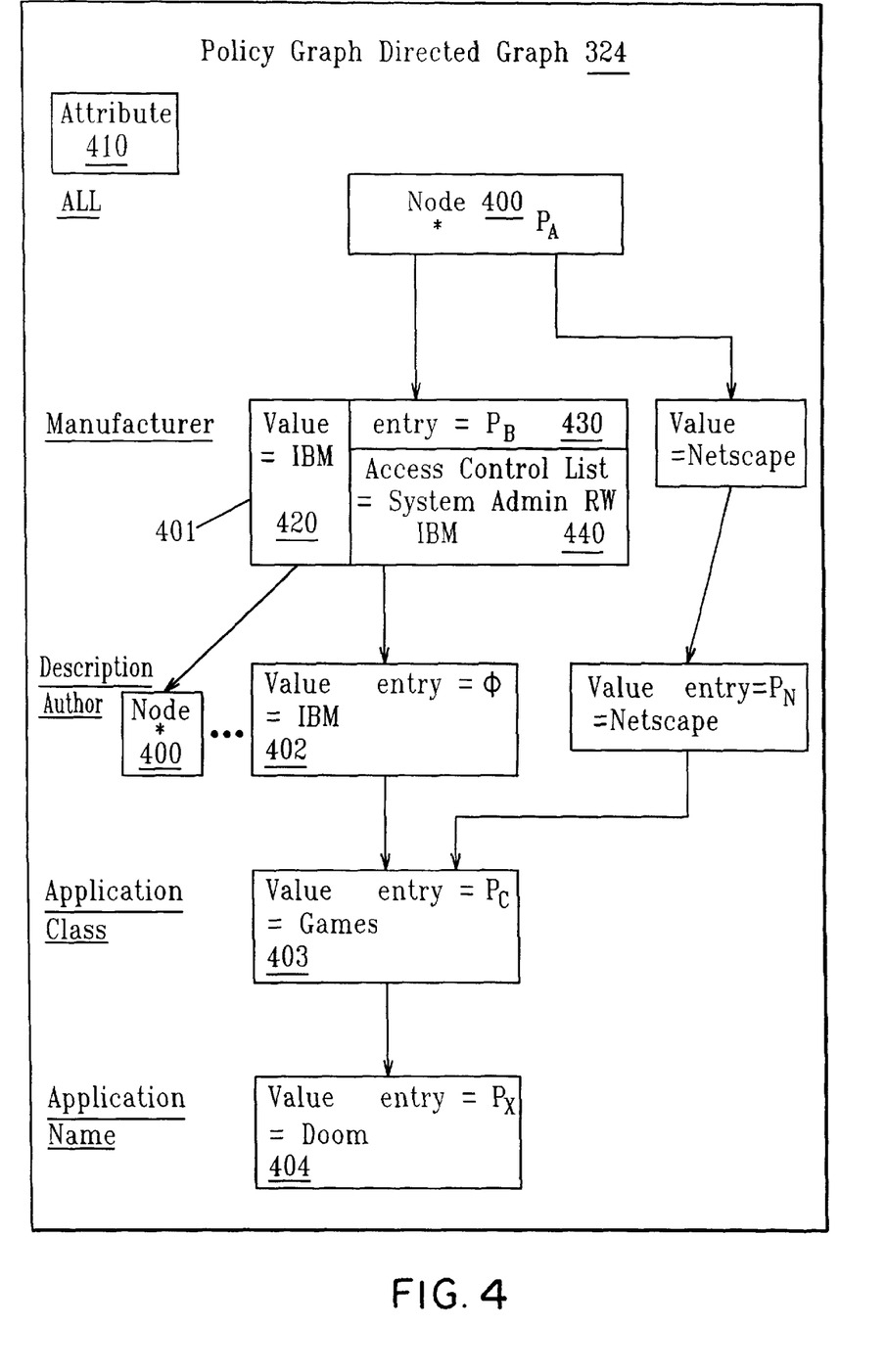
FIG. 4 illustrates that the nodes of a policy graph's directed graph consist of an attribute, a value, an entry, and an access control list.

As shown in FIG. 4, the nodes (400) of a policy graph's (320) directed graph (324) consist of an attribute (410), a value (420), an entry (430), and an access control list (440). The traversal method uses the node attribute (410) and node value (420) to match the node with the content's description (120). If a match occurs, then the combination method (323) applies the node entry (430) to the current result derived so far from the policy graph traversal (810). In a preferred embodiment, node entries (430) refer to permissions. The access control list (440) controls access to the node. In a preferred embodiment, principals can be permitted to read, write, delete, and create children of the node.

In the directed graph (324) shown in FIG. 4, an example traversal method (322) specifies that traversal starts at the root of the directed graph (324) and repeatedly follows the child link whose node's (400) attribute (410) value (420) is the same as the content description's (120) value for that attribute. An example combination method (323) is the union set operator. A traversal method (322) that goes from the root (400) to the manufacturer=IBM node (401) to the description author=IBM (402) to the application classes= games node (403) results in the permissions (580) $P_A \cup P_B \cup P_C$.

Note that Netscape content shares the same node at the application type level of the policy graph as the IBM content in our example. Therefore, the resulting permissions (580) for a content description (120) of manufacturer=Netscape (121), description author=Netscape (122), and application classes=games (123) is $P_A \cup P_N P_C$.

Figure 5:
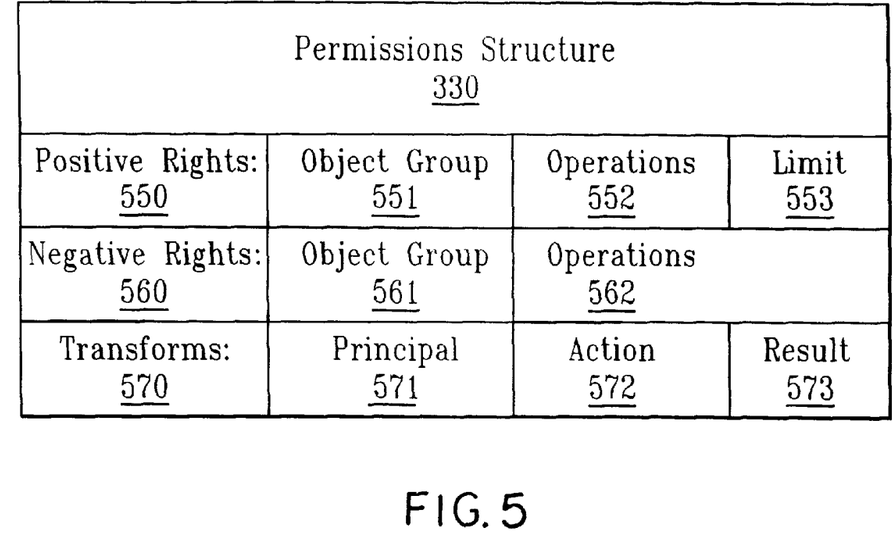
FIG. 5 illustrates a preferred embodiment of the permissions structure, and shows that permissions include positive and negative rights and transforms.

The permissions structure (330) in a preferred embodiment is shown in FIG. 5. Permissions (330) include positive (550) and negative rights (560) and transforms (570). Rights associate an object group (551) with a set of operations that are permitted or denied (552) and a limit for the number of times this permission may be used (553). In authorization, if a positive right (550) exists that grants an operation on an object and a negative right (560) exists that precludes the operation on that object, then the operation is not authorized.

That is, positive rights (550) are always superseded by negative rights (560). Object groups (551,561) may refer to logical objects and be mapped to physical objects at runtime to permit the same specification to cover multiple principals. Transforms (570) associate a delegating principal's (571) action (e.g., operation) (572) with modifications to permissions (573) (e.g., addition or removal of rights). For a transform (570) to apply, the rights to be delegated must be within the delegating principal's (571) maximal permissions contribution (140) for the delegatee's content. Also, the delegated rights must be within the maximal permissions (140) of the delegatee's content. Transforms (570) enable the current permissions (150) to evolve based on the state of the application.

The permissions propositions (300,310) describe how the current and maximal permissions (140,150) are derived from the contributions from multiple contributing principals. In a preferred embodiment, set operations (e.g., union, intersection) (301,311) are used to combine the permissions contributed by the contributing principals (110) and constraint propositions (302,312) imply the addition or removal (e.g, implication of positive or negative rights) of permissions.

Figure 6:
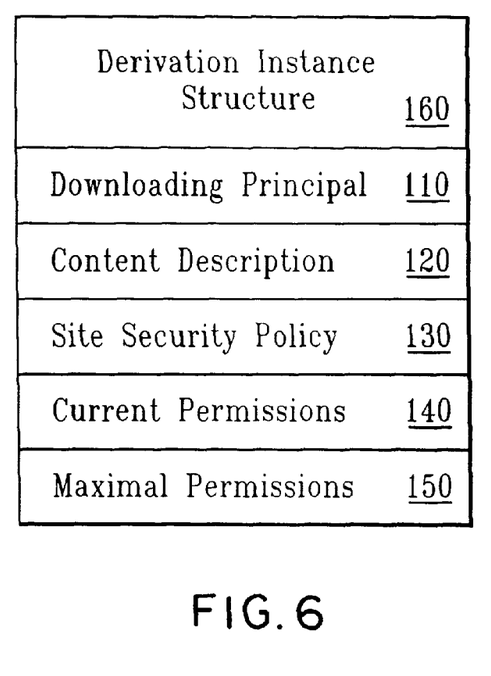
FIG. 6 illustrates the structure of a derivation instance which maps a content description and downloading principal to its current and maximal permissions, given a site security policy.

A derivation instance (160) maintains the state of the derivation. Its structure is shown in FIG. 6. A derivation instance (160) maps a content description (120) and downloading principal (110) to its current and maximal permissions (140,150) given a site security policy (130). Other fields can be added to maintain the state of the derivation.

Mechanism Description

Figure 7:
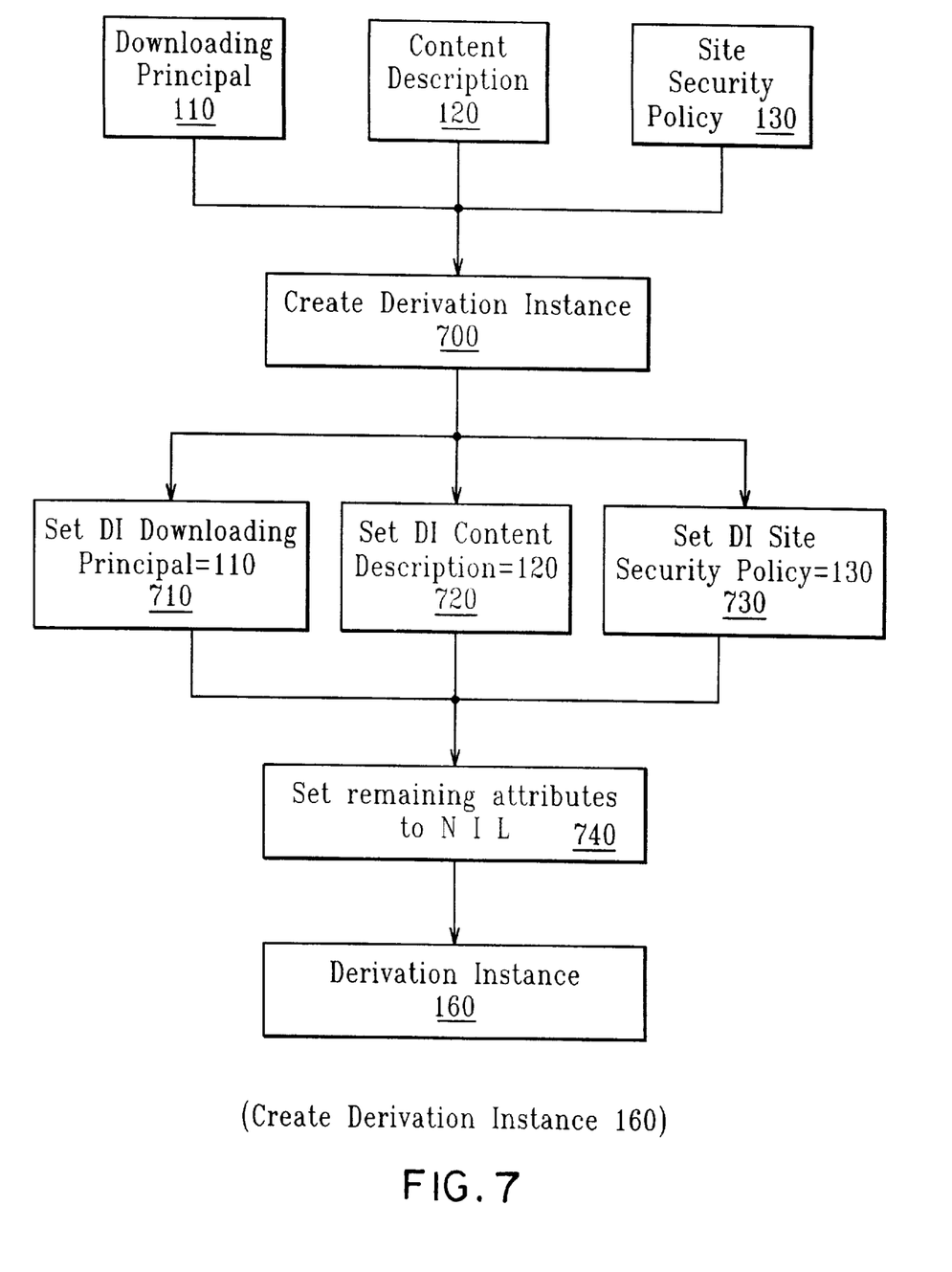
FIG. 7 illustrates how the first step of the dynamic derivation mechanism creates a derivation instance and sets its attributes values.

As shown in FIG. 7, step 1 of the derivation mechanism (100) creates a derivation instance (160) (700) and sets its attribute's values (710–740). The downloading principal (110), content description (120), and site security policy (130) are assigned to their corresponding attributes (710–730) in the derivation instance (160). The remaining attributes are set to null (740).

Figure 8:
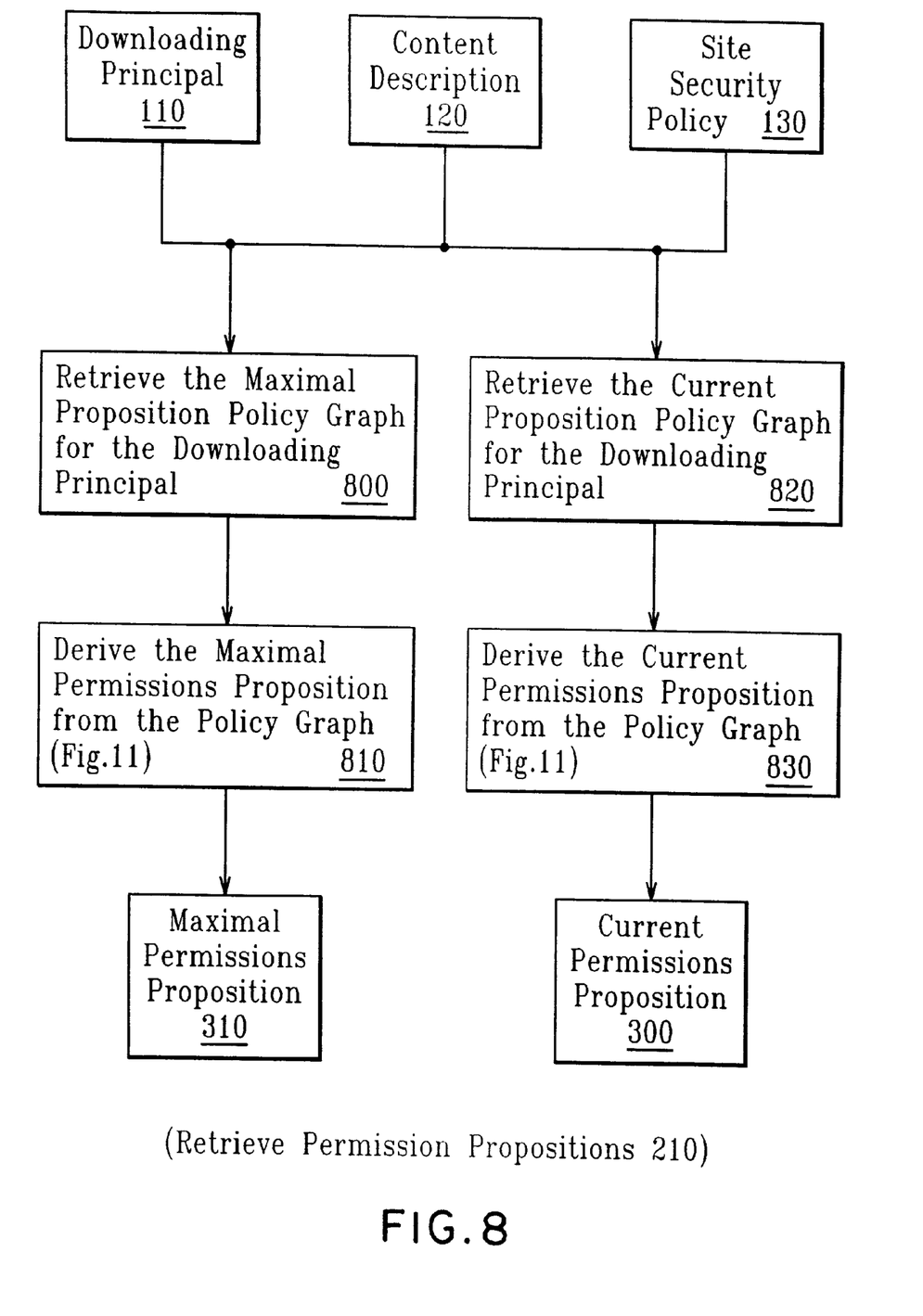
FIG. 8 illustrates how the second step of the dynamic derivation mechanism retrieves the maximal and current permissions propositions for the downloading principal and content description from the site security policy.

As shown in FIG. 8, step 2 of the dynamic derivation mechanism (100) retrieves the maximal and current permissions propositions (210) for the downloading principal (110) and content description (120) from the site security policy (130). First, the maximal permissions proposition policy graph is retrieved for this downloading principal (800). Next, at (810) the maximal permission propositions (310) are derived given the policy graph (320) and the content description (120) (as the description (1170) as described below and shown in FIG. 11). The current permission propositions (300) are retrieved similarly. First, its policy graph (320) is retrieved using the downloading principal (820). Next, at (830) the current permission propositions (300) are derived from the policy graph (320).

Figure 9:
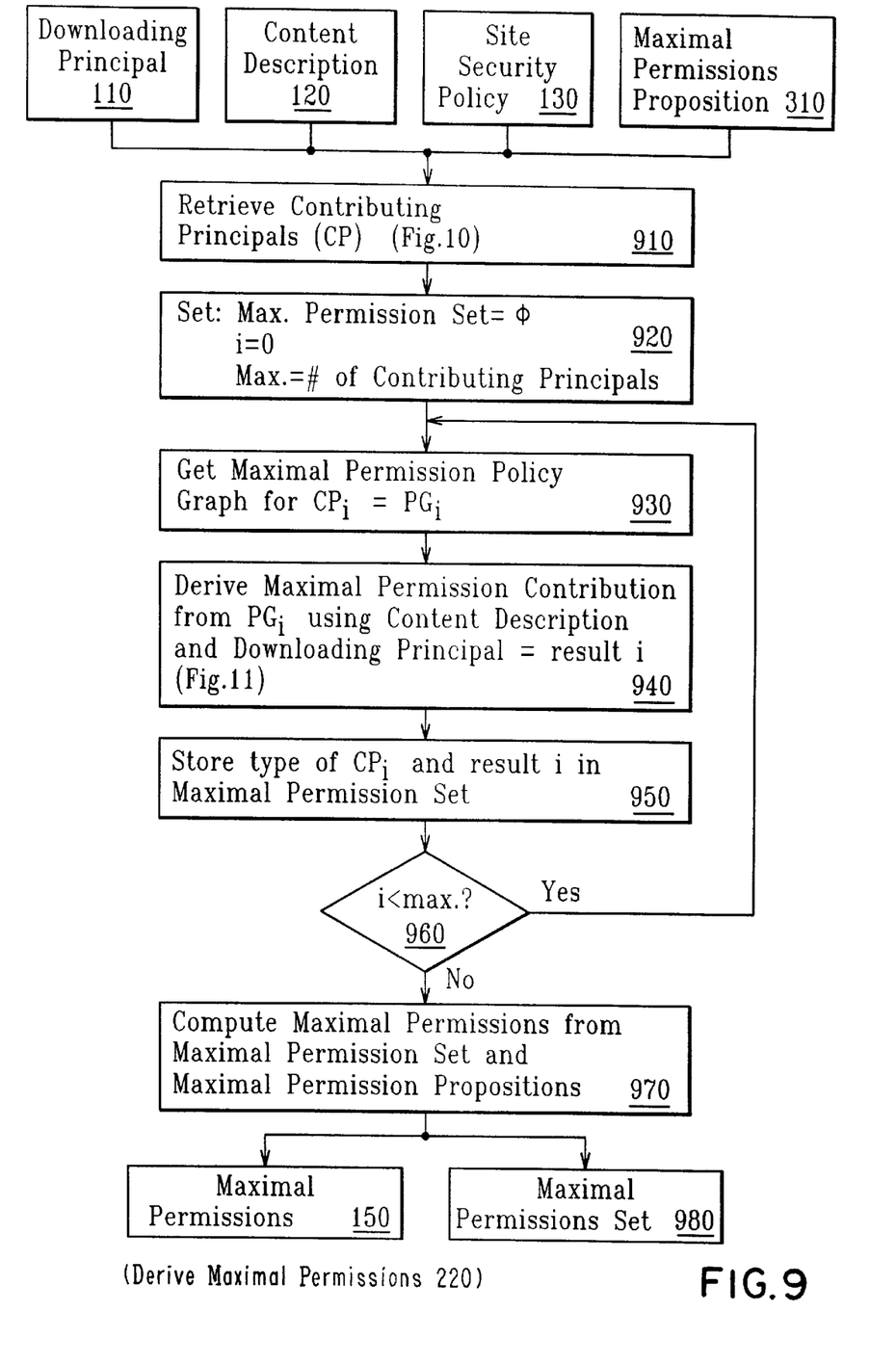
FIG. 9 illustrates how the third step of the dynamic derivation mechanism derives the maximal permissions from the contributions of each principal in the maximal permissions proposition equation.

As shown in FIG. 9, step 3 derives the maximal permissions (150) from the contributions of each principal in the maximal permissions proposition equation (312). First, the maximal contributing principals for the maximal permissions (150) are retrieved from the maximal permissions proposition equation (312) (910). Next, the number of principals are counted, and the maximal permission set is set to null (920). Then, for each maximal contributing principal, a maximal permissions policy graph is retrieved from the site security policy (130) (930). The maximal permissions policy graph is traversed (as described below and shown in FIG. 11) using the content description (120) and the downloading principal (110) (as the description (1170)) to obtain a maximal permissions contribution (1100) for this maximal contributing principal (1001) and derivation instance (160) (810). A mapping of the principal to this entry (1100) is added to the maximal permissions set (900) for the derivation instance (160) (950). This is repeated for each maximal contributing principal (1001) (960). Once all the contributions have been collected, the maximal permissions (150) are computed using the maximal permissions set (900) and the maximal permissions propositions (310).

Figure 10:
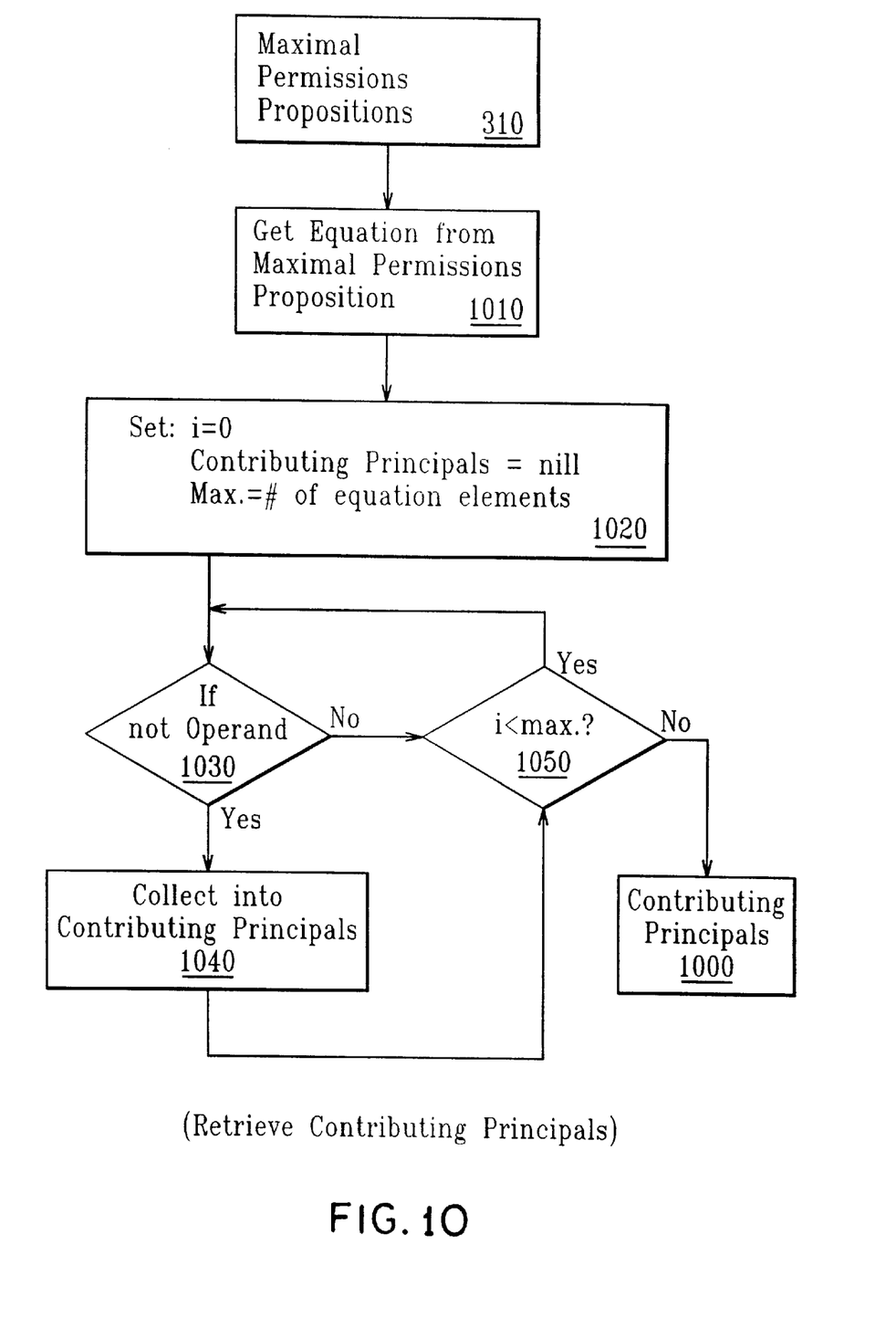
FIG. 10 illustrates how the contributing principals are extracted from the maximal permissions proposition.

As shown in FIG. 10, the contributing principals (1000) are extracted from the maximal permissions proposition (310) (910). First, the equation (312) is extracted from the maximal permissions proposition (310) (1010). For each term in the equation, the principal specified is collected into the contributing principals (1000) (1020–1040). This is done until all the terms in the equation (312) have been examined (1050).

Figure 11:
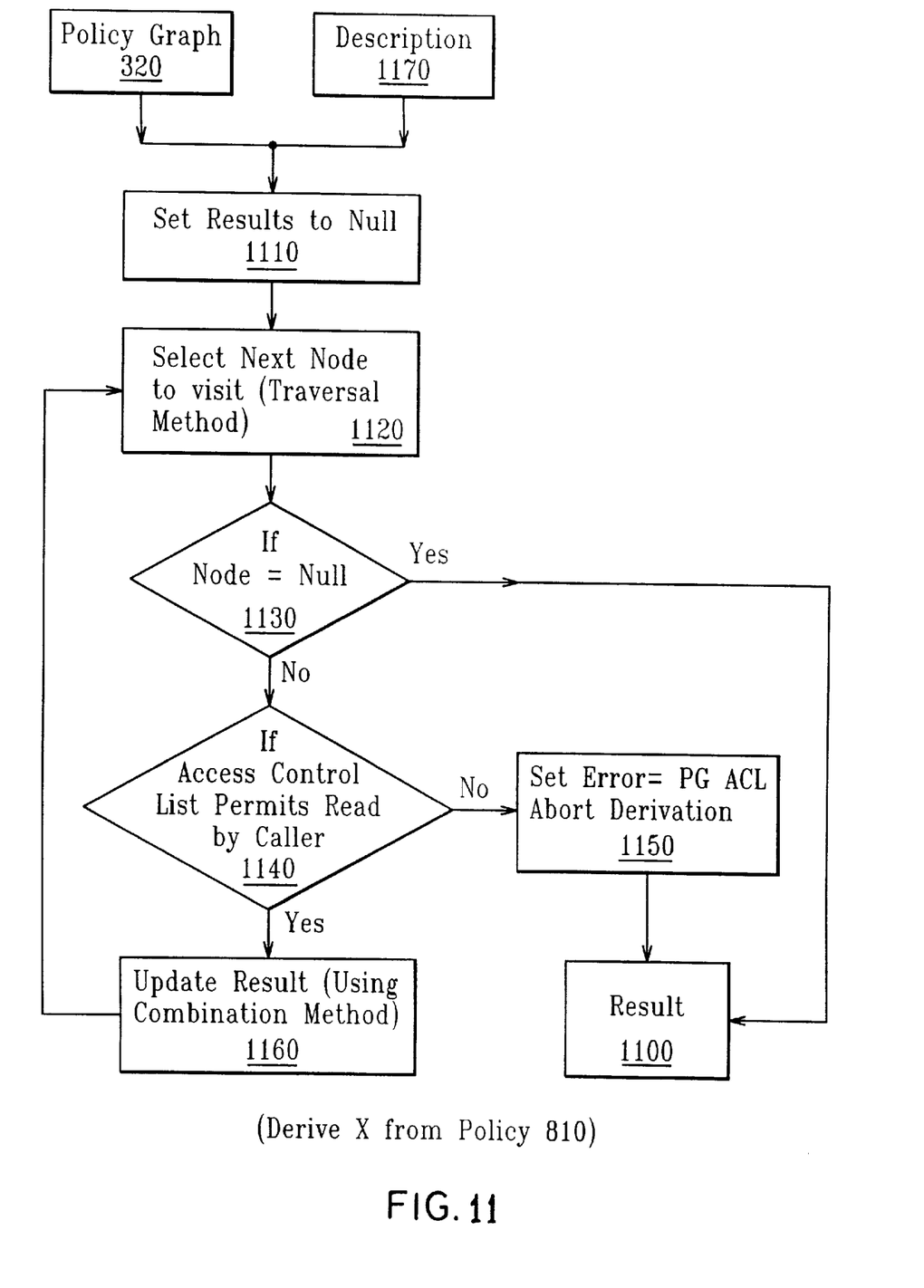
FIG. 11 illustrates how results are derived from a policy graph.

Results (1100) are derived from policy graph (320) (810) as shown in FIG. 11. First, the results are set to null (1110). Then, the traversal method (322) specifies the next node to visit (1120). If the node is not null (1130), then the node's access control list is checked to determine whether the read is permitted (1140). If the read is not permitted, the derivation is aborted (1150). Otherwise, the combination method is called to update the result (1100) (1160). This is repeated until there are no more nodes to visit (1130). The traversal method (322) and combination method (323) are policy-specific.

Figure 12:
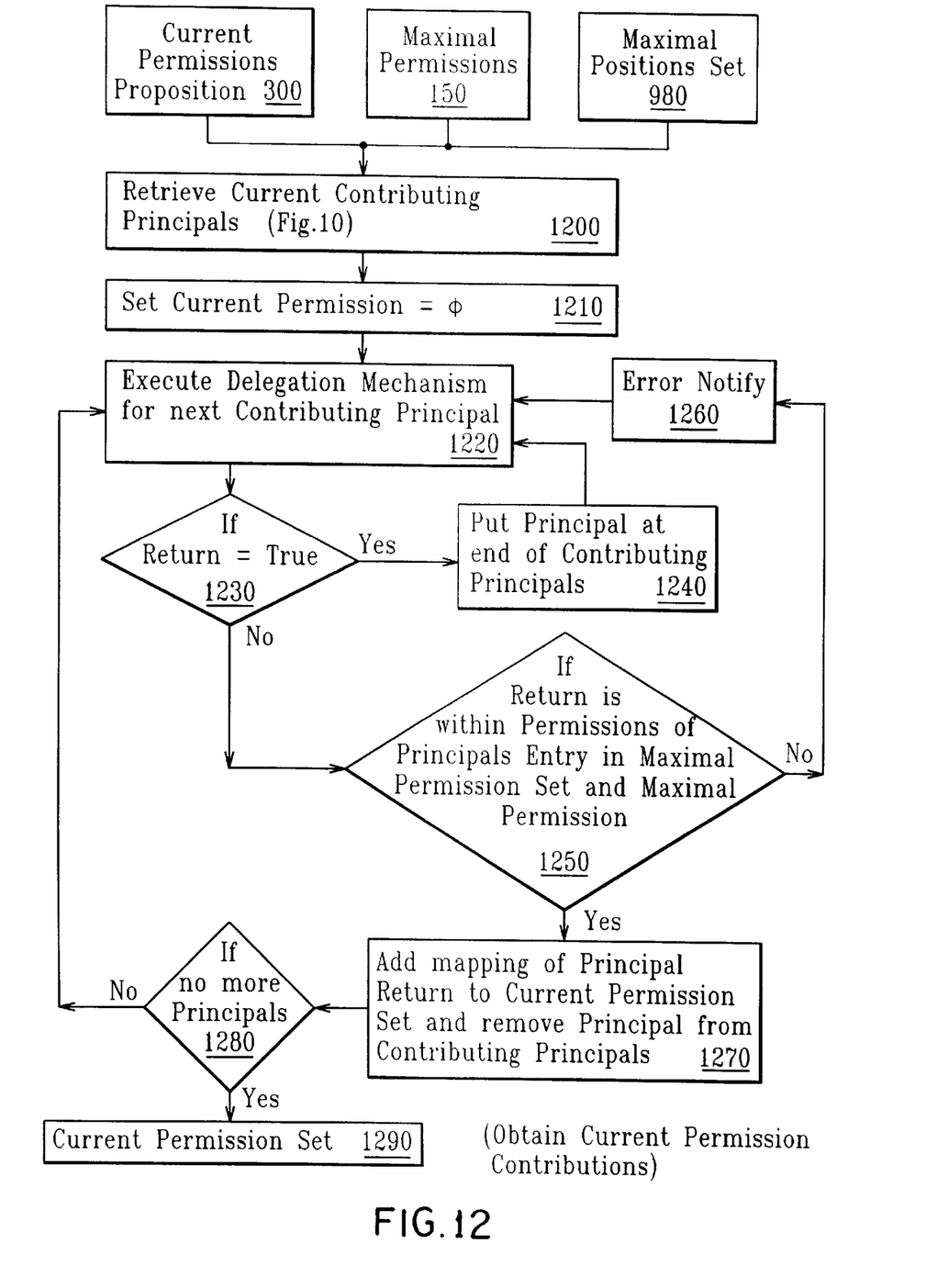
FIG. 12 illustrates how the fifth step of the dynamic derivation mechanism derives the current permission set from the principals that can contribute to the current permission set.

As shown in FIG. 12, step 4 derives the current permission set (1200) from the principals that can contribute to it. First, the current contributing principals are derived from the current permissions proposition (310) (1200). The current permission set is set to null (1210). For each current contributing principal (1002), its delegation mechanism (1220) is executed. A delegation mechanism (1220) implements the principal-specific mechanism for obtaining its contribution to the current permission set (1290) from the principal. If return is true, skip to the next current contributing principal (1230–1240). Otherwise, check if permissions returned are a subset of the principal's maximal permission set entry and maximal permissions computed in step 3 (150) (1250). If so, add the entry to the current permission set (1290) (1270). A mapping of the principal to its contribution is collected into the current permission set (1290). If not, notify the delegation mechanism of an error and repeat (1260, 1220). When no more principals want to contribute, the current permission set is complete (1280).

Step 5 combines the elements of the current permission set (1290) using the current permission propositions (300) to create the current permissions (140) for the derivation instance (160). Since each contribution in the current permission set (1290) is a subset of the maximal permissions (150) and no equation (302) operations are used that generate new set elements, the current permissions derived must be a subset of the maximal permissions (150).

EXAMPLES

This section describes how the dynamic derivation mechanism can improve the security of the derivation mechanism of an existing system (FlexxGuard) and how it can be used to enable collaborative applications to control derivation (collaborative system server).

JDK 1.1 FlexxGuard

JDK 1.1 FlexxGuard is an extension of the JDK 1.1 Appletviewer that enables users to assign more liberal permissions (480) to authenticated content from trusted sources while still tightly restricting untrusted content (see N. Islam et al., A Flexible Security System for Using Internet Content, in IEEE Software, pgs. 52–59, September, 1997). In FlexxGuard, downloading principals (110) and/or system administrators specify maximal permissions (150) for content based on their descriptions (120). The content description (120) for FlexxGuard content is shown in Table 2. Downloaded content can include a request for permissions (126) from the downloading principal (110). If this request (126) is a subset of the maximal permissions contribution of the system administrator, then the current permissions (140) of the content are set to the requested permissions (126). If not, then the downloading principal (110) can selectively override and/or modify the rights in the system administrator's maximal permissions contribution to create the current permissions (140) for the content.

(121) Manufacturer
(124) Application Name
(126) Requested Permissions
(127) Content Digest Table 2. FlexxGuard Content Description Using the dynamic derivation mechanism (100) to implement the same security requirements as FlexxGuard, the content execution system defines the maximal permissions contributions for users and system administrators to be the users' full permissions. System administrators express their current permission contributions for content based on the content's authenticated description (120). The user can override the system administrator's delegation entirely. Therefore, the current permission proposition equation (302) defines that the user's current permission contribution overrides the system administrators. If the requested permissions (126) are a subset of the system administrator's current permissions contribution, then the user grants these as the current permissions (140) of the content. The current permissions (140) are unchanged throughout the content's execution.

Security can be enhanced using the dynamic derivation mechanism (100) because the user and system administrator can be restricted to maximal permissions contributions that limit the rights that each may grant to content. Therefore, a user can be prevented from arbitrarily overriding the system administrator's contribution. The maximal permission contributions can be derived as described above (see FIG. 9) given the authenticated content description (126). The current permissions equation for this case would union the permissions added by the user to the set difference of the permissions granted by the system administrator and the permissions removed by the user.

Collaborative System Server

In a collaborative system server, collaborative applications (i.e., applications that manage collaborations) and collaborative actions of the participants are implemented as downloaded content. Application content is used directly by downloading principals (e.g., through an interface) to implement their actions in the collaboration and manage their view of the state of the collaboration. Collaborator content implements other users' actions in the application. For example, a collaborative editor is an application, and collaborators use content to implement their editing operations on documents.

In a collaborative system, the system administrator and user (i.e., downloading principal) determine the rights to grant (current and maximal) to the collaborative application. However, the collaborative application may, in addition to the user and system administrator, grant rights to the application's collaborative content. This enables objects that are controlled by the collaborative application to be made available based on application-specific policy. For example, a collaborative editor may decide to give all collaborators write access to a file object once the user has loaded it into the editor. However, some participants may only be permitted read access to the object (e.g., based on their role in the collaboration). This policy enables collaborative applications to selectively grant rights that are granted to it by the user.

This policy is implemented by system administrators defining policy graphs that determine the maximal permissions contributions of themselves, users, and the collaborative application. The permissions equations (302,312) then union the maximal and current permissions contributions derived and selected, respectively. In addition, the use of object groups in permissions (480) enables users to select the objects to which the collaborative application may have administrative control.

Consider the collaborative editor example again. Suppose the users' maximal permissions contribution permits them to grant read and write access to a set of "editable" files to the collaborative editor. The users may grant the collaborative application maximal permissions (150) to read and write these files. However, the user only grants the collaborative application access to a set of "active editable" files (i.e., its current permissions (140) only include read/write access to these files). The members of this set are determined dynamically by the user (e.g., using a trusted interface to select files to add to the set). Therefore, the collaborative application may be limited in the rights it can manage. Also, the limited set of rights may be determined dynamically.

The collaborative application can grant these rights to participants in the collaboration in a controlled, application-specific manner. In this case, the user and system administrator make no contribution to the maximal permissions of a participant. The collaborative application maximal permissions contribution makes the "editable" files available to the participants. The rights to access the files can be limited based on whether the participant is active (read/write) or passive (read only). The participant's current permissions are the "active editable" set of files that the user determines (however, this could be limited through the use of an indirection, such as "participant's active editable files"). Thus, participants can obtain their rights to files based on the user's decision about what files are needed and the application's policy that maps participants to roles.

Step 5 combines the elements of the current permission set (1290) using the current permission propositions (300) to create the current permissions (140) for the derivation instance (160). Since each contribution in the current permission set (1290) is a subset of the maximal permissions (150) and no equation (302) operations are used that generate new set elements, the current permissions derived must be a subset of the maximal permissions (150).

Having thus described our invention, what we claim as new, and desire to secure by Letters Patent is:

1. A method for deriving current and maximal permissions for executable content using:

a. one or more executable content descriptions;
   b. one or more sets of permissions (access rights) that describe the operations that executable content can perform on objects;
   c. one or more permission equations that compute a set of permissions from one or more other sets of permissions;
   d. one or more permission propositions that specify conditions under which associated modifications to permissions apply;
   e. one or more policy graphs that associate permissions, permission equations, and/or permission propositions with graph nodes;

wherein the method for deriving current and maximal permissions comprises the following steps;

f. deriving one or more permission equations and one or more permission propositions from policy graphs;
  g. deriving one or more maximal sets of permissions from policy graphs;
  h. selecting granted permissions from within an associated maximal set of permissions;
  i. combining one or more maximal sets of permissions into the maximal permissions using one permission equation and one or more permission propositions;
  j. combining one or more granted permissions into one current set of permissions which are a subset of the maximal permissions using one permission equation and one or more permission propositions.

2. A method as claimed in claim 1, wherein the content descriptions comprise attribute-value pairs.

3. A method as claimed in claim 2, wherein the attributes in the content description include the content manufacturer, content description author, content application class, content name, and content version.

4. A method as claimed in claim 2, wherein policy graph derivation retrieves the entry that corresponds to the attribute-value pairs in the content description.

5. A method as claimed in claim 1, wherein permissions specify operations that can be performed.

6. A method as claimed in claim 5, wherein permissions grant an operation, such that an authorization mechanism permits its execution.

7. A method as claimed in claim 6, wherein transforms are specified which define events that modify current permissions.

8. A method as claimed in claim 5, wherein permissions are either positive, such that they grant an operation, or negative, such that they preclude an operation.

9. A method as claimed in claim 1, wherein permissions specify operations that can be performed on objects.

10. A method as claimed in claim 9, wherein the objects in permissions refer to one or more objects.

11. A method as claimed in claim 10, wherein the objects are mapped to physical object names at runtime.

12. A method as claimed in claim 1, wherein permissions specify the operations that can be performed on objects and a limit to the number of such operations.

13. A method as claimed in claim 1, wherein permission equations perform set operations on one or more sets of permissions to compute a single set of permissions.

14. A method as claimed in claim 13, wherein permission equations use permissions which are associated with specific principals.

15. A method as claimed in claim 14, wherein specific principals include a system administrator, a downloading principal, and an application for which the content is being used.

16. A method as claimed in claim 1, wherein permission propositions add, remove or restrict a permission.

17. A method as claimed in claim 16, wherein permission propositions specify that the presence of two or more specific permissions results in the removal of one of the permissions.

18. A method as claimed in claim 16, wherein permission propositions specify that the presence of two or more specific permissions results in the restriction of one of the permissions.

19. A method as claimed in claim 16, wherein permission propositions specify that the presence of one or more specific permissions results in the addition of one or more permissions.

20. A method as claimed in claim 1, wherein a policy graph contains one or more linked nodes, and each node is linked to at least one other node in the policy graph.

21. A method as claimed in claim 20, wherein nodes are associated with specific attributes.

22. A method as claimed in claim 20, wherein the attributes are totally ordered.

23. A method as claimed in claim 20, wherein the nodes associate attribute-value pairs with entries.

24. A method as claimed in claim 20, wherein a node is linked to a node of the next lesser attribute in the total order if the entry of the second node is consistent with an extension of the description by that attribute-value pair.

25. A method as claimed in claim 20, wherein access to nodes is authorized based on a node access control list.

26. A method as claimed in claim 20, wherein the policy graph is associated with one or more principals.

27. A method as claimed in claim 20, wherein selection of a next node to access in a policy graph traversal is determined by a traversal method.

28. A method as claimed in claim 20, wherein derivation of the results of a policy graph traversal is specified by a combination method which combines a current node's entry with a result derived so far.

29. A method as claimed in claim 28, wherein the combination method combines values of a current node's entry before traversing its children/parents.

30. A method as claimed in claim 28, wherein the combination method combines values of a current node's entry after traversing its children/parents.

31. A method as claimed in claim 20, wherein access to the policy graph is authorized using an access control list.

32. A method as claimed in claim 20, wherein the policy graph nodes store permission equations as entries.

33. A method as claimed in claim 20, wherein the policy graph nodes store permission propositions as entries.

34. A method as claimed in claim 20, wherein the policy graph nodes store permissions as entries.

35. A method as claimed in claim 20, wherein a node is selected if its value for an attribute is the same as that of the description.

36. A method as claimed in claim 20, wherein a node is selected if its value for an attribute includes the value of that attribute in the description.

37. A method as claimed in claim 20, wherein the policy graph derivation unions the entries that correspond to the nodes selected in graph traversal by the traversal method.

38. A method as claimed in claim 20, wherein the policy graph derivation intersects the entries that correspond to the nodes selected in the graph traversal by the traversal method.

39. A method as claimed in claim 1, wherein site security policy concerning permissions, permission equations, permission propositions, and policy graphs is stored on one or more machines.

40. A method as claimed in claim 39, wherein site security policy is stored on a downloading principal's machine.

41. A method as claimed in claim 39, wherein site security policy is stored on a machine that is a secure server.

42. A method as claimed in claim 1, wherein a principal which intends to run the executable is used to derive permission equations, permission propositions, and/or maximal sets of permissions.

43. A method as claimed in claim 1, wherein a principal delegates any rights to content within its maximal permissions for that content.

44. A method as claimed in claim 1, wherein a principal delegates a right to content if it is within its maximal permissions for that content and the right is within the content's maximal permissions.

* * * * *